(12) United States Patent
Roos et al.

(10) Patent No.: US 11,819,832 B2
(45) Date of Patent: Nov. 21, 2023

(54) CATALYTIC REACTOR

(71) Applicant: EVONIK OPERATIONS GMBH, Essen (DE)

(72) Inventors: Meike Roos, Büdingen (DE); René Poss, Karlsruhe (DE); Monika Berweiler, Maintal (DE); Markus Göttlinger, Rodenbach (DE)

(73) Assignee: Evonik Operations GmbH, Essen (DE)

( * ) Notice: Subject to any disclaimer, the term of this patent is extended or adjusted under 35 U.S.C. 154(b) by 217 days.

(21) Appl. No.: 17/059,448

(22) PCT Filed: Sep. 25, 2020

(86) PCT No.: PCT/EP2020/076823
§ 371 (c)(1),
(2) Date: Nov. 29, 2020

(87) PCT Pub. No.: WO2021/058703
PCT Pub. Date: Apr. 1, 2021

(65) Prior Publication Data
US 2021/0275996 A1    Sep. 9, 2021

(30) Foreign Application Priority Data

Sep. 25, 2019 (EP) ..................... 19199657

(51) Int. Cl.
| | |
|---|---|
| *B01J 25/02* | (2006.01) |
| *B01J 35/10* | (2006.01) |
| *B01J 37/00* | (2006.01) |
| *B01J 35/04* | (2006.01) |
| *B01J 37/02* | (2006.01) |
| *B01J 37/08* | (2006.01) |
| *B01J 8/06* | (2006.01) |
| *B01J 19/30* | (2006.01) |

(52) U.S. Cl.
CPC ............... *B01J 25/02* (2013.01); *B01J 8/06* (2013.01); *B01J 19/305* (2013.01); *B01J 35/04* (2013.01); *B01J 35/1014* (2013.01); *B01J 35/1019* (2013.01); *B01J 35/1076* (2013.01); *B01J 37/0018* (2013.01); *B01J 37/0225* (2013.01); *B01J 37/08* (2013.01); *B01J 2208/023* (2013.01); *B01J 2219/30475* (2013.01); *B01J 2219/32286* (2013.01)

(58) Field of Classification Search
CPC ............ B01J 25/02; B01J 19/305; B01J 8/06
See application file for complete search history.

(56) References Cited

U.S. PATENT DOCUMENTS

| | | |
|---|---|---|
| 1,628,190 A | 5/1927 | Raney |
| 1,915,473 A | 6/1933 | Raney |
| 2,139,602 A | 12/1938 | Raney |
| 2,895,819 A | 7/1959 | Fiedler |
| 2,967,893 A | 1/1961 | Hort et al. |
| 2,977,327 A | 3/1961 | Raney |
| 4,049,580 A | 9/1977 | Oden et al. |
| 5,399,793 A | 3/1995 | Vargas et al. |
| 6,262,317 B1 | 7/2001 | Becker et al. |
| 6,969,780 B1 | 11/2005 | Dubner et al. |
| 7,524,996 B2 | 4/2009 | Lorenz et al. |
| 7,538,254 B2 | 5/2009 | Lorenz et al. |
| 7,572,941 B2 | 8/2009 | Lorenz et al. |
| 7,605,292 B2 | 10/2009 | Lorenz et al. |
| 7,612,241 B1 | 11/2009 | White et al. |
| 9,029,290 B2 | 5/2015 | Lee et al. |
| 9,346,079 B2 | 5/2016 | Lee et al. |
| 9,567,276 B2 | 2/2017 | Klasovsky et al. |
| 9,598,537 B2 | 3/2017 | Roos et al. |
| 9,943,818 B2 | 4/2018 | Jin et al. |
| 11,090,637 B2 | 8/2021 | Wieland et al. |
| 11,173,479 B2 | 11/2021 | Schroeter et al. |
| 11,260,375 B2 | 3/2022 | Berweiler et al. |
| 11,401,224 B2 | 8/2022 | Roos et al. |
| 2002/0151751 A1 | 10/2002 | Ostgard et al. |
| 2002/0193618 A1 | 12/2002 | Ostgard et al. |

(Continued)

FOREIGN PATENT DOCUMENTS

| | | |
|---|---|---|
| CA | 2 823 676 | 8/2012 |
| DE | 102 45 510 | 4/2004 |

(Continued)

OTHER PUBLICATIONS

Non Final Office for copending U.S. Appl. No. 16/338,015, dated Mar. 5, 2021.

(Continued)

*Primary Examiner* — Yong L Chu
(74) *Attorney, Agent, or Firm* — Law Office of: Michael A. Sanzo, LLC

(57) ABSTRACT

A catalytic reactor for industrial-scale hydrogenation processes is described. The catalytic reactor contains a catalytic fixed bed that comprises a support structure and a catalyst. During operation of the reaction in the catalytic reactor, the fixed bed is filled with reaction medium to at least 85% by volume. A very high contact area of the catalyst with the reaction medium is at the same time provided. The support structure is formed from material webs having a thickness of 5 to 25 μm, with a crosslinking density of at least 3 mm$^{-3}$ present. The support structure consists of metals selected from elements of groups 8, 6 and 11 of the periodic table of the elements and mixtures thereof.

20 Claims, 11 Drawing Sheets

(56) References Cited

U.S. PATENT DOCUMENTS

| | | | |
|---|---|---|---|
| 2003/0047505 | A1 | 3/2003 | Grimes et al. |
| 2004/0199019 | A1 | 10/2004 | Schmidt |
| 2011/0011772 | A1 | 1/2011 | Schmidt |
| 2012/0154983 | A1 | 6/2012 | Zhang et al. |
| 2014/0038816 | A1 | 2/2014 | Bakker et al. |
| 2014/0221700 | A1 | 8/2014 | Radivojevic et al. |
| 2018/0230081 | A1 | 8/2018 | Rüfer et al. |
| 2019/0210010 | A1 | 7/2019 | Pinkos et al. |
| 2019/0232256 | A1 | 8/2019 | Berweiler et al. |
| 2019/0232257 | A1 | 8/2019 | Weiland et al. |
| 2019/0344248 | A1 | 11/2019 | Pinkos et al. |
| 2020/0016579 | A1 | 1/2020 | Schreiber et al. |
| 2020/0016583 | A1 | 1/2020 | Merkel et al. |
| 2020/0276644 | A1 | 9/2020 | Buettner et al. |
| 2021/0032185 | A1 | 2/2021 | Roos et al. |
| 2021/0276091 | A1 | 9/2021 | Poss et al. |
| 2022/0362757 | A1 | 11/2022 | Poss et al. |
| 2022/0387986 | A1 | 12/2022 | Poss et al. |
| 2022/0395816 | A1 | 12/2022 | Poss et al. |
| 2023/0001388 | A1 | 1/2023 | Poss et al. |

FOREIGN PATENT DOCUMENTS

| | | | |
|---|---|---|---|
| DE | 10 2008 027 767 | 2/2010 | |
| DE | 10 2009 049 732 | 4/2011 | |
| EP | 0 340 970 | 11/1989 | |
| EP | 0 807 464 | 11/1997 | |
| EP | 2 764 916 | 8/2014 | |
| EP | 2 883 632 | 6/2015 | |
| EP | 3 115 106 | 1/2017 | |
| GB | 1 242 358 | 8/1971 | |
| WO | WO 02/055453 | 7/2002 | |
| WO | WO 2005/039764 | 5/2005 | |
| WO | WO 2007/028411 | 3/2007 | |
| WO | WO 2008/151614 | 12/2008 | |
| WO | WO 2018/060245 | 4/2018 | |
| WO | WO 2018/060269 | 4/2018 | |
| WO | WO-2018060245 A1 * | 4/2018 | .......... B01J 19/2495 |
| WO | WO 2021/058702 | 4/2021 | |
| WO | WO 2021/058704 | 4/2021 | |
| WO | WO 2021/058705 | 4/2021 | |
| WO | WO 2021/058706 | 4/2021 | |
| WO | WO 2021/058719 | 4/2021 | |

OTHER PUBLICATIONS

U.S. Appl. No. 17/053,340, filed Nov. 5, 2020, Poss.
Amendment & Response for copending U.S. Appl. No. 16/338,015, filed Jun. 30, 2021.
Ex Parte Quale Action for copending U.S. Appl. No. 16/338,015, mailed Aug. 10, 2021.
Response to Ex Parte Quale Action for copending U.S. Appl. No. 16/338,015, filed Oct. 10, 2021.
Notice of Allowance for copending U.S. Appl. No. 16/338,015, dated Oct. 25, 2021.
Notice of Allowance for copending U.S. Appl. No. 16/969,607, dated Jan. 4, 2022.
Request for Continued Examination for copending U.S. Appl. No. 16/969,607, filed Jan. 11, 2022.
International Search Report for corresponding PCT/EP2020/076823 filed Sep. 25, 2020.
Written Opinion of the International Searching Authority for corresponding PCT/EP2020/076823 filed Sep. 25, 2020.
International Search Report for PCT/EP2019/053236 (international counterpart of copending U.S. Appl. No. 16/969,607, filed Feb. 11, 2019.
Written Opinion of the International Searching Authority for PCT/EP2019/053236 (international counterpart of copending U.S. Appl. No. 16/969,607, filed Feb. 11, 2019.
International Preliminary Report on Patentability for PCT/EP2019/053236 (international counterpart of copending U.S. Appl. No. 16/969,607, filed Feb. 11, 2019.
European Search Report and Search Opinion for EP 18 15 6599 (European counterpart of copending U.S. Appl. No. 16/969,607, filed Feb. 14, 2018, with English language machine translation of the Search Opinion attached.
International Search Report for PCT/EP2017/074528 (international counterpart of copending U.S. Appl. No. 16/338,015, filed Sep. 27, 2017.
Written Opinion of the International Searching Authority for PCT/EP2017/074528 (international counterpart of copending U.S. Appl. No. 16/338,015, filed Sep. 27, 2017.
International Preliminary Report on Patentability for PCT/EP2017/074528 (international counterpart of copending U.S. Appl. No. 16/338,015, filed Sep. 27, 2017.
European Search Report and Search Opinion for EP 16 19 1735 (European counterpart of copending U.S. Appl. No. 16/338,015, filed Sep. 30, 2016, with English language machine translation of the Search Opinion attached.
International Search Report for PCT/EP2017/074491 (international counterpart of copending U.S. Appl. No. 16/338,044, filed Sep. 27, 2017.
Written Opinion of the International Searching Authority for PCT/EP2017/074491 (international counterpart of copending U.S. Appl. No. 16/338,044, filed Sep. 27, 2017.
International Preliminary Report on Patentability for PCT/EP2017/074491 (international counterpart of copending U.S. Appl. No. 16/338,044, filed Sep. 27, 2017.
European Search Report and Search Opinion for EP 16 19 1751 international counterpart of copending U.S. Appl. No. 16/338,044, filed Sep. 30, 2016, with English language machine translation of the Search Opinion attached.
Abdullah, et al., "The use of bulk density measurments as flowability indicators," *Powder Technology* 102(2):151-165 (May 1999).
Brunauer, et al., "Adsorption of Gases in Multimolecular Layers," *J. Am. Chem. Soc.* 60:309-319 (Feb. 1938).
Brunet Espinosa, "Ni in CNFs: Highly Active for Nitrate Hydrogenation," *ACS Catalysis* 6:5432-5440 (2016).
Coleman, et al., "Evaluation of Foam Nickel for the Catalytic Partial Oxidation of Methane," *Catalysis Letters* 128(1-2):144-153 (Nov. 2008).
Jiang, et al., "Polymer-supported catalysts for clean preparation of n-butanol," *Catalysis Science & Technology* 4(8):2499-2503 (May 2014).
Kolaczkowski, et al., "Potential for metal foams to act as structured catalysy supports in fixed-bed reactors," *CatalysisToday* 273:221-233 (2016).
Li, et al., "Ni—$Al_2O_3$/Ni-Foam Catalyst with Enhanced Heat Transfer for Hydrogenation of $CO_2$ to Methane," *AIChE Journal* 61(12):4323-4331 (Dec. 2015).
Liu, et al., :Monolithic catalysts with Pd deposited on a structured nickel foam packing, *Catalysis Today* 273:34-40 (Apr. 2016).
Luther, E. et al., "Nonostructured Metal Foams: Synthesis and Applications," PowderMet2009, Las Vegas, NV, Los Alamos National Laboratory, 12 pages (2009).
Petró, et al., "A new alumina-supported, not pyrophoric Raney-type Ni-catalyst," *Applied Catalysis A: General* 190:73-86., published 2000).
Ullman's Encyclopedia of Industrial Chemistry, "Metallic Foams" chapter, publisned online on Jul. 15, 2012, DOI: 25 10.1002/14356007.c16_c01.pub2.
*Ullmann's Encyclopedia of Industrial Chemistry*: G. Eigenberger, W. Ruppel: "Catalytic Fixed-Bed Reactors", Wiley-VCH, online ISBN: 9783527306732 | DOI: 10.1002/14356007; 2012).
*Ullmann's Encyclopedia of Industrial Chemistry*: D. Sanfilippo, P.N. Rylander: "Hydrogenation and Dehydrogenation", Wiley-VCH, online ISBN: 9783527306732 | DOI: 10.1002/14356007; 2012).
Office Action dated Sep. 18, 2019 for copending U.S. Appl. No. 16/338,044.
Response to Office Action filed Jan. 8, 2020 for copending U.S. Appl. No. 16/338,044.
Office Action dated Mar. 9, 2020 for copending U.S. Appl. No. 16/338,044.

(56) References Cited

OTHER PUBLICATIONS

Response to Office Action for copending U.S. Appl. No. 16/338,044, filed Aug. 9, 2020.
Notice of Allowance dated Sep. 28, 2020, for copending U.S. Appl. No. 16/338,044.
Restriction Requirement dated Oct. 26, 2020, for copending U.S. Appl. No. 16/338,015.
Response to Restriction Requirement filed Dec. 23, 2020 for copending U.S. Appl. No. 16/338,015.
U.S. Appl. No. 16/338,015, filed Mar. 29, 2019, Berweiler, US-2019/0232256 A1, Aug. 1, 2019.
U.S. Appl. No. 16/338,044, filed Mar. 29, 2019, Weiland, US-2019/0232257 A1, Aug. 1, 2019.
U.S. Appl. No. 16/969,607, filed Aug. 13, 2020, Roos.
Catillon, et al., "Development of new $Cu^{o}$-$Zn^{II/Al}{}_{2O3}$ catalyst supported on copper metallic foam for the production of hydrogen by methanol steam reforming," *Topics in Catalysis* vols. 30/31 Nos. 1-4:463- (Jul. 2004).
Sirijaruphan, et al., "Effect of metal foam supports on the selective oxidation of CO on Fe-promoted Pt/γ—$Al_{2O3}$," *Applied Catalysis A: General* 281:11-18 (2005).
Walther, et al., "A New Class of High Temperature and Corrosion Resistant Nikel-Based Open-Cell Foams," *Advanced Engineering Materials* 10(9):803 (Sep. 2008).
English language translation of Opposition by Alantum Europe GmbH dated Jan. 10, 2023.

\* cited by examiner

CATALYTIC REACTOR

CROSS REFERENCE TO RELATED APPLICATIONS

The present application is US national stage of international application PCT/EP2020/076823, which has an international filing date of Sep. 25, 2020 and which claims priority to EP 19199657.8, filed in Europe on Sep. 25, 2019. The contents of these prior applications is hereby incorporated by reference in its entirety.

BACKGROUND AND PRIOR ART

The invention provides a catalytic reactor for industrial-scale hydrogenation processes. The catalytic reactor contains a catalytic fixed bed that comprises a support structure and a catalyst and is characterized by particular features.

Catalytic hydrogenation processes rank among the most important operations in the chemical industry. They are a central element of organic raw material production and also the further processing of organic basic chemicals into, in some cases, highly specialized end products for a plethora of everyday uses in all areas of daily life. In the details of their execution, individual hydrogenation processes are as variable as the end products emerging at the end of the process chain that are part of our everyday life—from margarine to all-weather jackets to fuels, foams and plastics, agrochemicals, pharmaceuticals, paints, coatings and much more. What all industrial-scale hydrogenation processes have in common is that they are carried out at elevated temperatures and under elevated pressure in the presence of at least stoichiometric amounts of hydrogen and with the use of catalytic contacts.

Hydrogenation reactions are exothermic. The enthalpy of reaction is normally within a range of 105-125 kJ per mol $H_2$. According to Le Chatelier's principle, an excessive rise in temperature results in a shift in the chemical equilibrium to the reactant side—thus promoting dehydrogenation—and pushes down yields of the target products resulting from the hydrogenation. Measures to regulate the reaction temperature are accordingly an integral and key element of industrial hydrogenation processes, an example being the use of suitable hydrogenation catalysts that lower the activation energy of the reaction in the temperature range in which it is under kinetic control (and thus the energy input via the temperature that is necessary in order to initiate the reaction). A customary measure is an often highly specialized reactor design tailored to the target reaction. For example, the hydrogenation of gaseous reactants uses inter alia reactors with a construction that allows the temperatures at all stages in the reaction to be controlled by heat exchange or by the supply of hot or cold gases. Where there is very substantial evolution of heat, it is customary to use isothermally operated reactors in which the temperature is regulated via a specific heat-exchange medium. What all industrial-scale reactors have in common is that they are operated in a stationary manner for long periods, i.e. under constant operating conditions (see *Ullmann's Encyclopedia of Industrial Chemistry*: G. Eigenberger, W. Ruppel: "Catalytic Fixed-Bed Reactors", Wiley-VCH, online ISBN: 9783527306732|DOI: 10.1002/14356007; 2012).

A large number of additional parameters determine the conversion, yield and selectivity of a hydrogenation reaction. An overview is given for example in *Ullmann's Encyclopedia of Industrial Chemistry*: D. Sanfilippo, P. N. Rylander: "Hydrogenation and Dehydrogenation", Wiley-VCH, online ISBN: 9783527306732|DOI: 10.1002/14356007; 2012.

Hydrogenation reactions are commonly carried out on an industrial scale in continuously operated fixed-bed reactors. A fixed bed is understood as meaning a support (assembly) provided with a catalyst, said support having a large surface area and being fixed in the interior of a reactor (see RÖMPP Online—*Hydroprocessing*). The gases—in the case of hydrogenation processes at least hydrogen—and/or liquids (fluids) to be reacted flow through the reactor. The totality of the fluids, which optionally can also include an additional solvent, are referred to hereinafter as the reaction medium.

The reaction itself takes place on the catalyst (contact). The catalyst is applied to the support. The support may be a layer (packing, filling) of a fine-grained solid (support material: granules, beads, pellets, etc., hereinafter referred to as the "bulk material"), a tube bundle, a structured packing, etc. (see RÖMPP Online—*Festbett für die chemische Katalyse* [Fixed bed for chemical catalysis]).

Industrial-scale fixed-bed reactors for the hydrogenation of liquid reactants may be designed as trickle-bed reactors, liquid-filled reactors or as packed bubble-column reactors. In trickle-bed reactors, at least the liquid constituents of the reaction medium are loaded onto the fixed bed from above. In this type of reactor, the spatial distribution of the liquid reaction medium in the fixed bed is determined by the nature of the structure for the introduction of fluids at the reactor head. In many liquid-filled reactors and packed bubble-column reactors, the reaction medium flows through the reactor from the bottom to the top, which means it will always be distributed across the entire cross section of the reactor. Fixed beds consisting of relatively fine-grained bulk materials are generally used in bubble-column reactors rather than in trickle-bed reactors. Moreover, fixed-bed reactors in which flow is from the bottom are usually operated at higher pressures than conventional trickle-bed reactors in order to prevent the displacement from solution of volatile components of the reaction medium.

Reactor performance in fixed-bed reactors is inter alia and to a significant degree determined by the contact area of the catalyst (contact) with the reaction medium. The "contact area" is understood as meaning the macroscopic, i.e. geometric, surface provided by the support onto which the catalyst is applied and which comes into contact with the reaction medium when the reaction is in operation. The greater this contact area, the greater the reactor performance that can be expected. In general, the more fine-grained the bulk material used to form the fixed bed, the greater the contact area provided.

During flow through the catalytic fixed bed, a loss of pressure arises due to flow resistance, which depends on the shape and size of the support and also on the flow rate and flowability of the reaction medium. Typically, the more fine-grained the bulk material used to form the fixed bed, the greater this pressure loss. If the flow resistances in the fixed bed become too high, particles of the bulk material may begin to move. Depending on the material used, the movement in the fixed bed can result in mechanical abrasion, which over time leads to losses of the catalyst applied to the support and thus to a downturn in reactor performance. Furthermore, this movement in the fixed bed can result in the formation within the bed of larger flow channels through which the reaction medium flows without all the reactants present in the fluid coming into contact with the catalytic contact surface. In three-phase systems designed for the reaction of gaseous hydrogen and liquid reactants on a heterogeneous, i.e. solid, catalyst, such flow channels can give rise for example to demixing of the gas phase (i.e. the hydrogen) and liquid phase. This places limits on mass transfer in the inward transport to the catalyst surface of hydrogen and/or molecules of the reactant to be hydrogenated and consequent reductions in overall conversion and thus reactor performance.

When choosing a support that is suitable for forming a catalytic fixed bed, there is a conflicting objective between providing the largest possible contact area between the reaction medium and the support on the one hand and the avoidance on the other hand of high flow resistances caused by the support material being too fine-grained and the above-described disadvantages that result therefrom. Since the fall in pressure increases sharply with decreasing particle diameter, only bulk materials having a particle diameter>2 mm are used industrially (see M. Baerns et al, *Technische Chemie* [Industrial chemistry], chapter 8.8.1.1, 2nd edition 2013, ISBN 978-3-527-33072-0).

Continuously operated fixed-bed reactors used on an industrial scale can have fixed-bed volumes of up to 100 m$^3$. Depending on the bulk density of the bulk material used to form the fixed bed and the height of the fixed bed used, this means that the support constructions of the reactor itself, the support constructions for the fixed bed in the reactor, and especially the lower layers of the catalytic fixed bed, may be subjected to loads of several metric tons in weight. If the support used to form the fixed bed does not have sufficient mechanical stability and durability to support such weights over several thousand hours of operation, this can lead to breakage of the support structures and thus to mechanical breakdown of the catalytically active regions (catalyst breakage). Broken material may be discharged with the fluid from the reactor into adjoining plant components and/or result in caking in the fixed bed. In both cases, significant disruptions to plant operation are the result.

A diverse range of embodiments of catalytic fixed-bed reactors are known from the prior art that may (also) be employed in industrial-scale hydrogenation processes. A comprehensive overview is provided inter alia by G. Eigenberger and W. Ruppel in *Ullmann's Encyclopedia of Industrial Chemistry*: G. Eigenberger, W. Ruppel: "Catalytic Fixed-Bed Reactors", Wiley-VCH, online ISBN: 9783527306732|DOI: 10.1002/14356007; 2012).

THE PRESENT INVENTION

The object of the present invention is to provide an improved catalytic reactor for industrial-scale hydrogenation processes that can be used in the widest-possible range of hydrogenation processes, since it provides the largest possible contact area between reaction medium and support, but at the same time minimizes flow resistances of the reaction medium through the fixed bed, and which additionally employs a support structure having improved mechanical stability, with the result that catalyst breakage is reliably avoided over the operating lifetime of the reactor. The object is achieved by a catalytic reactor,
    containing a catalytic fixed bed having a volume V,
    comprising a support structure and a catalyst,
characterized by the following features:
    During operation of the reaction, the catalytic fixed bed is filled with reaction medium to at least 85% by volume; and
    the contact area of the catalyst with the reaction medium is at least 2000 m$^2$ per m$^3$ volume of the catalytic fixed bed.

The catalytic fixed bed used in the catalytic reactor of the invention comprises a support structure formed from material webs that has a dense three-dimensional network of crosslinks extending in all directions in space. The catalyst is applied onto this support structure.

It was found that the above-described conflicting objective between providing the largest possible contact area between the reaction medium and the catalyst on the one hand and the avoidance on the other hand of high flow resistances during through-flow of the reaction medium through the catalytic fixed bed can be resolved when the thickness of the material webs forming the support structure is in the range of 5 to 25 μm. In addition, the support structure must have a crosslinking density of at least 3 mm$^{-3}$, i.e. there must be at least 3 crosslinks per mm$^3$ volume of the catalytically active fixed bed. A crosslink is a point in the support structure at which material webs from at least two directions in space meet and there form a cohesive connection. The crosslinking density is the number of crosslinks per unit volume. A material web is understood as meaning the cohesive connection of two crosslinks. The material webs forming the support structure have a thickness preferably of 5 to 15 μm. The crosslinking density is preferably 3 to 100 mm$^{-3}$ and very particularly preferably 10 to 65 mm$^{-3}$.

FIG. 1 shows, in outline form that is not drawn to scale, sections from examples of support structures of the invention and illustrates schematically the terms "material web" (1) and "crosslink" (2). FIG. 2 is a light microscopy image of a section from a support structure of the invention.

In order to ensure adequate stability of the catalytic fixed bed, particularly for relatively large catalytic reactors, the support structure needs to be made from a material having sufficient mechanical durability and strength. In addition, the material must have adequate thermal stability and pressure resistance in order to withstand unchanged the reaction conditions typically prevailing in a hydrogenation reactor. A further basic requirement of the support material is that it must be chemically resistant.

The term "strength" describes the maximum possible internal resistance of a material against external stress. It is mechanical tension that causes the material to break when subjected to a uniform increase in stress. Typical forms of stress include stresses caused by tension, pressure, buckling or bending of the material. Strengths can be determined experimentally, there being various DIN standards for strength determinations according to the nature of the stress on the material. For example, standard DIN 50106:2016-11 provides a description of the experimental determination of the compressive strengths of metals.

In order to ensure adequate stability of the catalytic fixed bed, the support structure of the invention needs to have adequate compressive strength, since an industrial-scale reactor having a volume of several cubic metres may be subjected to loads of several tonnes, especially in the lower layers of the catalytic fixed bed. A point to note is that, although the compressive strength of the support structure of the invention can be determined experimentally according to the method described in DIN 50106:2016-11, the data obtained must be evaluated and analysed in a modified manner, since said structure is not a solid workpiece, but a three-dimensional, highly crosslinked structure composed of thin material webs. The particular construction of the support structures of the invention means that only relatively small forces need to be applied in order for plastic deformation of the material webs in the sample to occur. The tension-compression curve resulting from the compressive strength measurement accordingly shows a discontinuity and a local maximum in the tension force even at moderate compression values, before, after a fall in tension, a steady rise with increasing compression occurs, as is also observed with "classic" solid workpieces (see FIG. 3). This local maximum of the tension-compression curve can be used to determine the compressive strength of such three-dimensionally highly crosslinked structures. The tension determined at the local maximum of the tension-compression curve in relation to the volume of the sample is referred to as the compressive strength of the support. The support structure of the invention has compressive strengths within a range from 0.5 to 20 kPa/mm$^3$, preferably 1 to 15 kPa/mm$^3$ and more preferably 1.5 to 7.5 kPa/mm$^3$.

The combination of the above-described features of the support structure results, after application of a suitable catalyst, in a catalytic fixed bed that, during operation of the reaction, is filled with reaction medium to at least 85% by volume, and at the same time has a catalyst contact area with the reaction medium of at least 2000 m$^2$ per m$^3$ volume of the catalytic fixed bed. During operation of the reaction, the catalytic fixed bed is filled with reaction medium preferably to at least 90% by volume, more preferably 90% to 95% by volume. The direct catalyst contact area with the reaction medium is preferably 2000 to 12 000 m$^2$ per m$^3$ volume of the catalytic fixed bed, more preferably 2300 to 7500 m$^2$ per m$^3$ volume of the catalytic fixed bed.

The support structure consists of metals selected from elements of groups 8, 6 and 11 of the periodic table of the elements and mixtures thereof. Particularly suitable are metals selected from the group consisting of iron, cobalt, nickel, copper, silver and/or mixtures thereof, since these metals are characterized by good processability, high mechanical durability and—with suitable processing—by chemical resistance under typical conditions of a hydrogenation reaction, and also by acceptable raw material costs. Particular preference as the principal constituents of the support structure is given to cobalt, nickel, copper and/or mixtures thereof.

The production of a support structure having the features of the invention from the abovementioned metals is carried out in a template-based production process, since, for a material web of the invention having a thickness in the range of 5 to 25 µm, it is not possible for the metals to form stable cohesive connections through customary metal processing methods such that a crosslinking density of at least 3 mm$^{-3}$ arises. For the production of the support structure, an organic template is in a first step produced from a suitable organic polymer. This template must already have the spatial features of the metallic support structure to be produced, but does not need to have the required mechanical strength. In particular, the crosslinking density must be within the range according to the invention. Techniques for producing such template structures from organic polymers are known to those skilled in the art of polymer chemistry and polymer processing. Correspondingly suitable templates, for example ones made of polystyrene, polyurethane, polyethylene, polypropylene, polyethylene terephthalate and other modern polymers, are known in the prior art and are commercially available.

A thin layer of the metal that is being used to form the support structure is applied to the organic template by sputter coating. This first layer should provide all-over coverage, but be only a few layers of atoms thick. The thickness of such sputter coatings typically does not exceed 0.15 µm. Such sputter coating processes are likewise well known in the prior art and established industrial practice. The purpose of this sputter coating is to bring the organic template into a conductive state. The metal that is being used to form the support structure is deposited galvanically onto the thus pretreated organic template according to a known and industrially established process until a metal layer thickness of not more than 30 µm is achieved. The organic template is removed thermolytically in a subsequent heat treatment, leaving no residues. Depending on the polymer used, pyrolytic breakdown of the organic template is effected in the presence of atmospheric oxygen and within a temperature range between 300 and 750° C., preferably between 400 and 600° C. and more preferably between 480 and 580° C. In a second heat-treatment step, the support structure thus obtained is further annealed under a reducing atmosphere within a temperature range from 750 to 1100° C. The temperature during this second annealing step depends on the material used to form the support structure and is chosen in accordance with the melting temperature of the metal(s) used. This temperature must not exceed 0.75*T$_m$, where T$_m$=melting temperature of the metals used. The heat-treatment under a reducing atmosphere results in the reduction back to elemental metal of any metal oxides formed in the first heat-treatment step, resulting in the formation of a stable metallic structure. The formation of any defects and imperfections in the metal structure arising from the first heat-treatment step under atmospheric oxygen is reversed, restoring the ductility and elasticity required for the mechanical stability of the resulting support structure.

The support structure thus produced may be catalytically inert under the reaction conditions prevailing in the catalytic reactor of the invention. There is however also the possibility of catalytically active metals having been included during the process used to produce the metallic support structure, for example due to corresponding deposition impurities in the galvanic bath used to form the material webs on the organic template. If necessary, these catalytically active elements introduced into the material webs forming the support structure must then be "activated" in a further step, for example by etching or another chemical post-treatment process.

The support structure of the invention is preferably catalytically inert and serves as the support body for a suitable catalyst that can be selectively tailored to the reaction that is to be carried out in the catalytic reactor of the invention.

The catalyst may be applied to the support structure in the form of a catalytically active coating. Similarly to monolithic substrates used in automotive exhaust gas catalysis, the support structure of the invention, as well as the necessary dimensional stability, has continuous cavities through which a coating suspension can be sucked or pumped. It is also possible to apply a coating suspension by dipping (called "dip coating") or by spraying (called "spray coating"). Which of the application processes known in principle in the prior art is preferable depends firstly on the composition and the flow properties of the coating suspension, and secondly on the actual structure of the support structure employed as the support body. Dip coating has the greatest possible tolerance to varying properties of the coating suspension and is therefore suitable for coating of all support structures of the invention.

A catalyst coating consists of predominantly oxidic components. The principal constituent is inorganic support oxides having very high specific surface areas of between 50 and 200 m$^2$/g of support oxides. The catalytically active components are distributed over this surface. These inorganic support oxides have multiple functions in the finished catalyst: they firstly serve to increase the macroscopic, i.e. geometric, surface area provided by the support structure of the invention, which is referred to in the context of this invention as the contact area of the catalyst with the reaction medium at the microscopic level. Secondly, they can themselves interact with the molecules to be hydrogenated and hence influence the course of the reaction. More particularly, the choice of support oxide influences the selectivity of complex hydrogenation reactions in which multiple functional groups of organic substrate molecules can react with hydrogen. In addition, they provide the microscopic surface on which the catalytically active components are distributed. They also form a matrix in which further functional components and additives used to "adjust" specific catalyst functions when tailoring the catalyst to a specific application may be distributed.

Preference is given to using inorganic oxides selected from the group consisting of aluminium oxide, silicon dioxide, titanium oxide and mixtures thereof as support oxides.

Catalytically active components used are transition metals preferably selected from the group consisting of iron, ruthenium, osmium, cobalt, rhodium, iridium, nickel, palladium, platinum, copper, silver, gold and mixtures thereof. Particularly preferred catalytic components for hydrogenation reactions are transition metals selected from the group consisting of iron, ruthenium, cobalt, rhodium, iridium, nickel, palladium, platinum, copper, gold and mixtures thereof.

As further functional components and additives, the catalytic coating may include inorganic oxides, preferably selected from the oxides of the alkaline earth metals, the oxides of the transition metals, of the rare earths, the oxides of aluminium and gallium, the oxides of silicon, germanium and tin, and/or mixtures thereof.

In the catalytic reactor of the invention, the proportion of a catalyst applied by coating onto the preferably catalytically inert support structure of the invention is 2 to 500 kg/m$^3$ based on the volume of the catalytic fixed bed, preferably 2 to 100 kg/m$^3$ based on the volume of the catalytic fixed bed. It contains, based on the total amount of the catalytic coating forming the catalyst, preferably 60% to 99.8% by weight of support oxides, 0.2% to 10% by weight of catalytically active components and optionally additives and functional components (the remainder).

In order to apply the catalyst to the support structure of the invention, a coating suspension is produced by introducing the constituents into water. The catalytic components are applied to the support oxides either by prior impregnation of the support oxides with appropriate metal salt solutions (precursor solutions) or by addition of precursor solutions directly to the coating suspension and optionally precipitation or chemically induced deposition or breakdown of the precursor compound on the already suspended support oxide(s). Functional components and additives can also be introduced in this way or added directly as oxidic solids. Alternatively, it is possible to add all constituents of the catalyst that result from soluble precursors by reimpregnation methods after the support oxides have been applied to the support structure of the invention. The choice of preparation method is determined by the target composition and the properties of the resulting catalyst that are to be established.

In order to ensure good adhesion of the catalyst to the support structure of the invention, the addition of adhesion-promoting substances or binders may be necessary, which can be applied to the support structure of the invention before coating with the catalyst suspension.

The support structure coated with catalyst suspension is calcined in air so as to achieve fixing of the catalyst to the support structure and thus produce the fixed bed of the invention that is then introduced into the catalytic reactor.

When cobalt, nickel, copper and/or mixtures thereof are main constituents of the support structure of the invention, or when the support structure consists of cobalt, nickel, copper and/or mixtures thereof, it is preferable, before coating with the catalyst suspension, to produce a thin layer of aluminium oxide as an adhesion-promoting layer directly on the support of the invention. For this purpose, the support structure of the invention is first provided with an adhesion promoter that permits the application of a thin layer of aluminium. Suitable adhesion promoters are organic compounds that improve adhesion between metals and organic materials and are preferably selected from the group consisting of polyvinylpyrrolidone (PVP), waxes, ethylene glycol, polyethyleneimine and mixtures of said compounds. Particular preference is given to using an aqueous polyethyleneimine solution. The adhesion promoter is preferably applied to the support structure of the invention by treating the support structure of the invention with a solution containing 0.5% to 10% by weight of the adhesion promoter at room temperature. The solution preferably has a content of 1% to 8% by weight of adhesion promoter, more preferably of 2% to 7% by weight of adhesion promoter. The adhesion promoter solution may be applied to the support structure of the invention by pumping it or sucking it through. Preferably, the adhesion promoter solution is sprayed onto the support structure of the invention or the support structure is immersed in the adhesion promoter solution. After the adhesion promoter has been applied to the support structure of the invention, aluminium powder is applied to the support structure. Application is preferably carried out using a fine-grained aluminium powder having a particle size not exceeding $d_{99}$=200 μm and a narrow particle size distribution. Particularly preferably, the $d_{50}$ value of the particle size distribution of the aluminium powder is within a range from 20 to 70 μm, with a $d_{99}$ value not exceeding 150 μm. The aluminium powder to be applied may also be provided with an adhesion promoter, for which the adhesion-promoting substances already mentioned above are likewise suitable. The aluminium powder is applied to the support structure of the invention in as uniform a distribution as possible. After suspending or fluidizing the powder in a suitable medium, this can be done for example by immersing the support structure in the resulting powder matrix or by spraying the appropriately prepared powder or a suspension of the powder onto the support structure of the invention.

It is also possible to apply aluminium layers by sputtering techniques or by deposition from the gas phase by CVD (chemical vapour deposition) methods. Depending on the spatial extent of the support structure, such processes may be associated with a high level of complexity and correspondingly high costs.

After the aluminium has been applied, the support structure of the invention is subjected to heat-treatment in air (calcining) to bring about oxidization of the aluminium and formation of an aluminium oxide layer. The calcination temperatures are preferably between 200° C. and 1200° C., more preferably between 300° C. and 1000° C. and most preferably between 350° C. and 750° C.

A support structure of the invention thus treated can be coated particularly efficiently with a catalyst. The "aluminium oxide skin" produced on the surface of the support structure ensures extremely good binding of the support oxides of the catalyst and results in a long shelf life and lifetime and also extremely high mechanical stability, especially abrasion stability, of the catalytic fixed bed in the catalytic reactor of the invention, even in long-term use over several thousand hours of operation.

When cobalt, nickel, copper and/or mixtures thereof are main constituents of the support structure of the invention, or when the support structure consists of cobalt, nickel, copper and/or mixtures thereof, it is preferable to apply an activated metal catalyst onto the support structure if the catalytic reactor of the invention is to be used as a hydrogenation reactor. For this, an adhesion promoter is first applied to the support structure of the invention. Suitable adhesion promoters are organic compounds that improve adhesion between metals and organic materials and are preferably selected from the group consisting of polyvinylpyrrolidone (PVP), waxes, ethylene glycol, polyethyleneimine and mixtures of said compounds. Particular preference is given to using an aqueous polyethyleneimine solution. The adhesion promoter is preferably applied to the support structure of the invention by treating the support structure of the invention with a solution containing 0.5% to 10% by weight of the adhesion promoter at room temperature. The solution preferably has a content of 1% to 8% by weight of adhesion promoter, more preferably of 2% to 7% by weight of adhesion promoter. The adhesion promoter solution may be applied to the support structure of the invention by pumping it or sucking it through. Preferably, the adhesion promoter solution is sprayed onto the support structure of the invention or the support structure is immersed in the adhesion promoter solution. After the adhesion promoter has been applied to the support structure of the invention, aluminium powder is applied to the support structure. Application is preferably carried out using a fine-grained aluminium powder having a particle size not exceeding $d_{99}=200$ μm and a narrow particle size distribution. Particularly preferably, the $d_{50}$ value of the particle size distribution of the aluminium powder is within a range from 20 to 70 μm, with a $d_{99}$ value not exceeding 150 μm. The aluminium powder to be applied may also be provided with an adhesion promoter, for which the adhesion-promoting substances already mentioned above are likewise suitable. Preference is given to using semisynthetic waxes having a dropping point within a temperature range from 120° C. to 180° C. and to which is added aluminium power in a proportion from 1% to 10% by weight. The aluminium powder is applied to the support structure of the invention in as uniform a distribution as possible. After suspending or fluidizing the powder in a suitable medium, this can be done for example by immersing the support structure in the resulting powder matrix or spraying the appropriately prepared powder onto the support structure of the invention.

After being coated with aluminium powder, the support structure of the invention is subjected to heat-treatment to incorporate the aluminium into the material webs through alloy formation. The heat-treatment is carried out with the exclusion of atmospheric oxygen under an inert gas atmosphere within a temperature range from 500 to 1000° C., preferably from 600 to 800° C. In this process, moisture and residual organic material from the preceding coating process are first removed. This is followed by the aluminium becoming at least partially liquefied and incorporated into the support structure of the invention through alloy formation. The exclusion of atmospheric oxygen prevents the formation of oxidic layers that would interfere badly in a subsequent process to produce the activated metal catalyst on the surface of the support of the invention.

During the heat-treatment, intermetallic phases with aluminium form on the surface of the material webs of the support of the invention. When cobalt, nickel, copper and/or mixtures thereof are main constituents of the support structure of the invention, or when the support structure consists of cobalt, nickel, copper and/or mixtures thereof, intermetallic phases of the composition $MeAl_x$ form, where Me is cobalt, nickel or copper and the stoichiometric factor x has a value of between 0.33 and 3. Aluminium can be dissolved out chemically from the resulting intermetallic phases $MeAl_x$ where $x \geq 1$, giving rise to the formation, on the surface of the material webs of the support of the invention, of an open-pore metal sponge that has high catalytic activity in hydrogenation reactions. This metal sponge that, in the case of the invention, is supported on the metallic material webs, i.e. firmly attached to the material webs, is an activated metal catalyst for hydrogenation reactions.

This activated metal catalyst is produced through a so-called "activation" of the previously produced support structure of the invention having an applied coating of intermetallic phases of the type $MeAl_x$, where $0.33 \leq x \leq 3$ and Me is selected from cobalt, nickel, copper and/or mixtures thereof. This is done by treating the material with aqueous basic solutions, preferably with solutions of alkali metal hydroxides selected from the group consisting of sodium hydroxide, potassium hydroxide or lithium hydroxide. Particular preference is given to aqueous sodium hydroxide solution. The concentration of this aqueous alkali metal hydroxide solution used to produce the catalyst may be between 0.1% and 60% by weight. The aluminium is dissolved out—this step is also referred to as leaching—with a preferably 5% to 40% by weight, more preferably 5% to 25% by weight, aqueous sodium hydroxide solution at a temperature of 20° C. to 100° C., preferably at 40° C. to 85° C., more preferably at 50° C. to 80° C. Besides the other reaction conditions mentioned above, the leaching times to be employed here, i.e. the reaction times of the alkali metal hydroxide solution with the support of the invention modified with aluminium-containing intermetallic phases depend on the aluminium content to be achieved in the catalytic fixed bed and may be between 2 and 240 minutes. The aluminium content in the catalytic fixed bed has an influence on the catalytic performance and lifetime of the catalyst and on the hydrogenation activity and chemical stability in the reaction medium in particular. As a first general rule of thumb, it can be assumed that the lower the residual aluminium content, the higher the hydrogenation activity of the catalytically active fixed bed of the invention. The residual aluminium contents achieved in the fixed bed of the invention are preferably between 2% and 20% by weight, more preferably between 5% and 15% by weight, based on the total mass of the fixed bed. As a second general rule of thumb, it can be assumed that the lower the residual aluminium content, the higher the chemical stability of the fixed bed of the invention, particularly in processes operated at reaction medium pH values above 8 and temperatures above 120° C. The residual aluminium contents achieved in the fixed bed of the invention are preferably between 2% and 17% by weight, more preferably between 3% and 12% by weight, based on the total mass of the fixed bed.

The active metal catalyst produced on the support structure of the invention may be modified by postdoping with further metals, the metals preferably being selected from the transition metals. For postdoping, the support structure with the catalytically active metal sponge produced thereon is treated with a preferably aqueous solution of the doping element(s) to be applied. The employed aqueous solution of the doping element(s) to be applied must have a pH equal to or greater than 7 in order not to damage the metal sponge. To the solution of the doping element(s) to be applied may be added a chemically reducing component to bring about reductive deposition of the dissolved doping element(s) on the metal sponge. Preferred doping elements for modifying the active metal catalyst produced on the support structure of the invention are selected from the group consisting of molybdenum, platinum, palladium, rhodium, ruthenium, copper and mixtures thereof.

The catalytic reactor of the invention contains a catalytic fixed bed comprising a support and a catalyst, with the support having a particular spatial structure formed from material webs having a thickness in the range of 5 to 25 µm and a crosslinking density of at least 3 $mm^{-3}$. The material webs forming the support structure have a thickness preferably of 5 to 15 µm. The crosslinking density is preferably 3 to 100 $mm^{-3}$ and very particularly preferably 10 to 65 $mm^{-3}$.

In the catalytic fixed bed of the invention, the open regions through which the reaction medium can flow without major flow resistance and the large contact area of the applied catalyst with the reaction medium interact synergistically, giving the reactor of the invention many technical advantages.

Industrial-scale hydrogenation processes are carried out at elevated pressure and elevated temperature in the presence of at least stoichiometric amounts of hydrogen. Because hydrogenation reactions are exothermic, with an excessive rise in temperature in the catalytic fixed bed resulting, in accordance with Le Chatelier's principle, in a shift in chemical equilibria to the reactant side and a consequent reduction in process yields, measures for temperature regulation in the reactor are a central element of many existing processes and not uncommonly require an often highly specialized reactor design that is tailored to the target reaction. The catalytic fixed bed of the invention is characterized in being filled with reaction medium to at least 85% by volume during operation of the reaction and allowing through-flow without substantial flow resistance even at relatively high flow rates. At the same time, an extremely high catalyst contact area is provided, which results in the molecules to be hydrogenated having adequate contact with the catalyst even at high flow rates and means that long residence times are usually not necessary. A substantial part of the temperature regulation in the reactor can accordingly be effected via the reaction medium, which is used both to introduce the heat needed to initiate the chemical reaction at the catalyst and to conduct away the excess heat evolved as a result of the exothermicity of the reaction. The temperature in the catalytic fixed bed can accordingly be adjusted very robustly largely through the flow rate. This means that for liquid reaction media in particular, which have adequate heat capacity, there is no need in most hydrogenation applications for costly heat-exchange or heat-regulation fittings in the reactor. The local "heat pockets" typical of fixed-bed materials of the prior art which, as a consequence of the presence of regions of poor through-flow in fixed beds of the prior art, can on an industrial scale result in losses in yield and selectivity, are absent by virtue of the particular structure of the catalytic fixed bed of the invention. A catalytic reactor of the invention is therefore in the simplest case a flow-through tube or flow-through cylindrical pressure vessel in which the catalytic fixed bed of the invention is housed, with this preferably held on a sieve plate or a comparable holder.

Since the advantages mentioned are manifest particularly in hydrogenation processes on an industrial scale, a catalytic reactor of the invention preferably contains a catalytic fixed bed of the invention having a volume V of between 0.5 and 100 $m^3$, more preferably between 1 and 50 $m^3$ and very particularly preferably between 2 and 25 $m^3$.

The particular spatial structure of the support structure of the invention in the catalytic fixed bed results additionally in the reaction medium being able to flow through the fixed bed in the catalytic reactor of the invention without high flow resistance being registered. High flow resistances result in high losses in pressure of the gas flowing through, which must be counteracted by a correspondingly high inflow pressure. The use of the catalytic reactor of the invention thus permits reductions in the hydrogen inflow pressure and hence savings on costs and energy in the hydrogenation plant. Moreover, reduced flow resistance means that movement in the catalytic fixed bed during operation and consequent shedding of catalyst material due to mechanical abrasion are reduced. Fine material from the catalyst fixed bed generated by mechanical abrasion collects at the bottom of the reactor and can result in contamination of downstream plant components, particularly in the case of reactors of the prior art operated in trickle-bed mode. Contaminated pipework and valve blockages can result, which can sometimes also jeopardize the operational safety of the system. Through the use of the catalytic reactor of the invention, cleaning and maintenance intervals can be extended, downtimes reduced and the operational safety of the overall plant increased.

The particular spatial structure of the support structure of the invention in the catalytic fixed bed results in additional improvements in mass transfer in the catalytic reactor of the invention, particularly when the catalytic reactor of the invention is designed according to the liquid-filled reactor principle, as illustrated in FIG. 4 (B). The particular microscopic structure of the highly crosslinked and yet open support of the invention has an influence on the macroscopic fluid dynamics in the reactor, brings about a fundamental increase in the integral gas content by comparison with bubble column designs of the prior art, and improves the radial distribution of the hydrogen in the reactor. This results in improved inward transport of hydrogen to the catalyst. The use of the catalytic reactor of the invention consequently allows the achievement of increased yields with the same energy input or comparable yields with reduced energy input. The magnitude of the technical effect that is achievable depends on the material system to be hydrogenated and, in the case of "drop-in solutions", additionally on the overall geometry of the reactor and on the infrastructure of the entire hydrogenation plant.

The catalytic reactor of the invention contains a catalytic fixed bed comprising a support and a catalyst, with the support having a particular spatial structure formed from material webs having a thickness in the range of 5 to 25 µm and a crosslinking density of at least 3 $mm^{-3}$. The material webs forming the support structure have a thickness preferably of 5 to 15 µm. The crosslinking density is preferably 3 to 100 $mm^{-3}$ and very particularly preferably 10 to 65 $mm^{-3}$. The support structure of the invention consists of a material having high mechanical durability and strength, adequate thermal stability and pressure resistance, and high chemical resistance. The support structure of the invention has compressive strengths within a range from 0.5 to 20 $kPa/mm^3$, preferably 1 to 15 $kPa/mm^3$ and more preferably 1.5 to 7.5 $kPa/mm^3$. The support structure consists of metals selected from elements of groups 8, 6 and 11 of the periodic table of the elements and mixtures thereof, and more preferably from metals selected from the group consisting of iron, cobalt, nickel, copper, silver and/or mixtures thereof. Very particular preference as the principal constituents of the support structure is given to cobalt, nickel, copper and/or mixtures thereof.

As a result of the high degree of crosslinking and of the low thickness of the material webs of the support structure in the range of 5 to 25 µm, the catalytic fixed bed housed in the catalytic reactor of the invention is characterized by a very low fill-weight. The fill-weight is understood as meaning the weight of the catalytic fixed bed in relation to the volume thereof. Typically, the fill-weight of the fixed bed housed in the catalytic reactor of the invention is between 0.1 and 1 kg/m$^3$, preferably 0.2 to 0.8 kg/m$^3$ and particularly preferably 0.3 to 0.7 kg/m$^3$. Consequently, the total weight of the catalytic reactor of the invention is considerably lower by comparison with customary known reactors, even in the case of large reactor volumes of up to 100 m$^3$. This allows savings on materials, and thus on costs, in the construction of reactor housing constructions and reactor support elements.

EXAMPLES

To demonstrate that the reactors of the invention resolve the typical conflict of objectives when operating reactors containing classical bulk materials, i.e. that the reactors of the invention are thus able to achieve the largest possible contact area between the reaction medium and the support while at the same time minimizing high flow resistances (minimization of the pressure loss across the catalytic fixed bed), the results of pressure-loss measurements in a catalytic reactor of the invention are presented.

Provision of a Catalytic Reactor of the Invention:

To form a support structure of the invention, eight commercially available cylindrical nickel foam bodies 80 millimetres in diameter and 250 millimetres in length and having a porosity of 95%, a pore size of 580 µm and a density of 742 kg/m$^3$ were coated with binder by immersion in an aqueous binder solution containing 2.5% by weight of high-molecular-weight polyethyleneimine homopolymer and then coated with a wax-containing aluminium powder (containing 3% by weight of Ceretan 7080 wax) having a particle-size distribution with a $d_{99}$ of 63 µm. The resulting weight ratio of applied aluminium powder to nickel foam body base was 0.27. The resulting body was heated in an atmosphere of oxygen-free nitrogen to 680° C. over a period of 10 minutes and held at this temperature for approx. one minute. The foam body was then "quenched" to approx. 200° C. and after this allowed to cool to room temperature. This heat-treatment resulted in the aluminium becoming alloyed in the nickel foam body with the formation of superficial intermetallic nickel-aluminium phases. Optical evaluation of scanning electron micrographs of embedded samples in cross section revealed the persisting presence in the interior of the nickel foam body of webs of pure nickel with a thickness of 10 µm. The support structure of the invention thus formed had a crosslinking density of 30 mm$^{-3}$.

In the next step, an activated metal catalyst was produced from the superficially applied intermetallic nickel-aluminium phases. For this, the aluminium fractions present in the intermetallic phases were dissolved out of the intermetallic phases by treatment with a 10% by weight sodium hydroxide solution. This was done by heating the support structures formed above in 10% by weight sodium hydroxide solution to 55° C. over a period of 30 minutes and treating them with sodium hydroxide solution at this temperature for approx. 30 minutes. The alkali was then removed and the support structures washed with water for approx. one hour.

To form the catalytic reactor of the invention, the eight catalytic fixed beds thus produced were introduced into a glass tube having an internal diameter of 80 millimetres and a length of 2000 millimetres and fixed in place by means of a retaining plate at the bottom and a screening grid at the top. The eight catalytic fixed beds were introduced such that they were stacked on top of one another with no spaces in between and fixed in place so that they were resting firmly on the inner glass wall and unable to shift position with respect to one other, thus preventing any spaces from forming between the individual bodies. An inlet connector at the bottom and an outlet connector at the head were attached to the glass tube by means of ground-glass joints.

The catalytic bed thus produced had a volume capable of reaction medium through-flow of 92.1 vol % and a catalyst contact area with the reaction medium of 4997 m$^2$ per m$^3$ volume of catalytic fixed bed.

Pressure-Loss Measurements:

In the catalytic reactor of the invention thus produced, the pressure loss across the catalytic fixed bed was determined with media of two different viscosities at various flow rates. The test media used for this were water (density: 1.015 g/ml; viscosity: 20 mPas) and ethylene glycol (density: 1.1018 g/ml; viscosity: 69 mPas). For the pressure-loss measurement, the test medium was fed into the reactor of the invention at various flow rates through the inlet connector at the bottom. The difference in pressure across the catalytic fixed bed was determined by means of pressure sensors in the reactor inflow and outflow.

The results are presented in FIG. 5.

Comparison with the Prior Art:

Comparative data for catalytic fixed beds of the prior art were obtained by simulation calculation. A theoretical simulation was performed of the pressure loss across a packed fixed bed composed of particles of a non-porous bulk material having a cuboidal geometry of the dimensions 4×4×2 millimetres, the fixed bed formed from the bulk material having a diameter of 80 millimetres and a length of 2000 millimetres. Non-porous bulk material particles served as the comparison material of the prior art, since in the case of commercially available catalyst bodies of the prior art that are introduced into reactors as "heaped" catalyst beds, the reaction medium flows around them only externally. Although the internal porosity of the bulk material particles places limits on mass transport in the reaction process, it does not generally have any significant influence on the pressure loss observed across the catalyst bed.

The pressure loss across the packing is calculated using the Ergun equation (source: *Fluid flow through packed columns*. Ergun, Sabri. 1952, Chem. Eng. Prog., p. 48.):

$$\Delta p = \frac{150 \mu L}{D_p^2} \frac{(1-\epsilon)^2}{\epsilon^3} v_s + \frac{1.75 L \rho}{D_p} \frac{(1-\epsilon)}{\epsilon^3} v_s |v_s|$$

where:

| | |
|---|---|
| $\epsilon$ | Porosity |
| $\mu$ | Fluid viscosity |
| $\rho$ | Fluid density |
| $v_s$ | Fluid velocity |

| | |
|---|---|
| $D_p$ | Equivalent diameter |
| L | Tube length |
| Δp | Pressure loss |

This equation consists of a laminar term and a turbulent term that are differently weighted over the respective flow parameters according to the flow regime. When describing non-porous particles that the liquid or gas flows around only externally, the Ergun equation can be used to predict the pressure loss, the equivalent diameter in the case of cuboidal particles being calculated as follows:

$$D_p = \sqrt[3]{\frac{6 \cdot a \cdot b \cdot c}{\pi}}$$

| | |
|---|---|
| $D_p$ | Equivalent diameter for the Ergun equation |
| a | Width of the particle cuboid |
| b | Length of the particle cuboid |
| c | Depth of the particle cuboid |

In the present case, the pressure loss was calculated as a function of the mass flow, with a mass flow considered that corresponded to the to the measurements in the catalytic reactor of the invention that are shown above.

The comparison of the data obtained from the simulation with the data for the flow medium water measured in the catalytic reactor of the invention (density: 1.015 g/ml; viscosity: 20 mPas) shows that the pressure loss across the system of the invention is reduced by approx. 35-40% compared with the non-porous bulk material system (see FIG. 6).

Investigations into Mechanical Stability:

To demonstrate the high mechanical stability of the catalyst fixed bed, which allows catalyst breakage to be avoided over the operating lifetime, the results of investigations into the stability to breakage of samples of a support structure of the invention are presented in comparison with measurements on bulk material particles of the prior art.

FIG. 7 shows by way of example the result of a compressive strength measurement on a sample of a support structure of the invention having the dimensions 4 mm×4 mm×2 mm carried out on a commercial Instron instrument for the determination of compressive strength.

In addition, FIG. 8 shows the deformation of tested samples after performance of the compressive strength measurement.

Measurement on a total of 20 samples did not show a single case of catalyst breakage. Even at forces of up to 80 N, all that was observed was pressure deformation (see FIG. 9).

For comparison purposes, the compressive strength of 20 samples of a commercial nickel catalyst extrudate (bulk material of the prior art) of the Octolyst® series was investigated. Shaped bodies having dimensions of 2-5 millimetres, a bulk density of 0.7-1.3 kg/L and a nickel content of 15-50% by weight were subjected to corresponding compressive strength measurements. FIG. 10 shows the measurement curves obtained. In all cases the test ended with breakage of the catalyst body on application of forces between 20 and 110 newtons.

FIG. 11 shows the tested bulk material of the prior art before the measurement and the broken material obtained as a result of the measurement.

The support structure of the invention and catalyst fixed beds resulting therefrom show distinctly improved mechanical stability compared with catalyst fixed beds of the prior art which specifically avoids catalyst breakage over the operating lifetime of the catalytic reactor of the invention.

A description of the figures is given hereinbelow:

Figure 1:
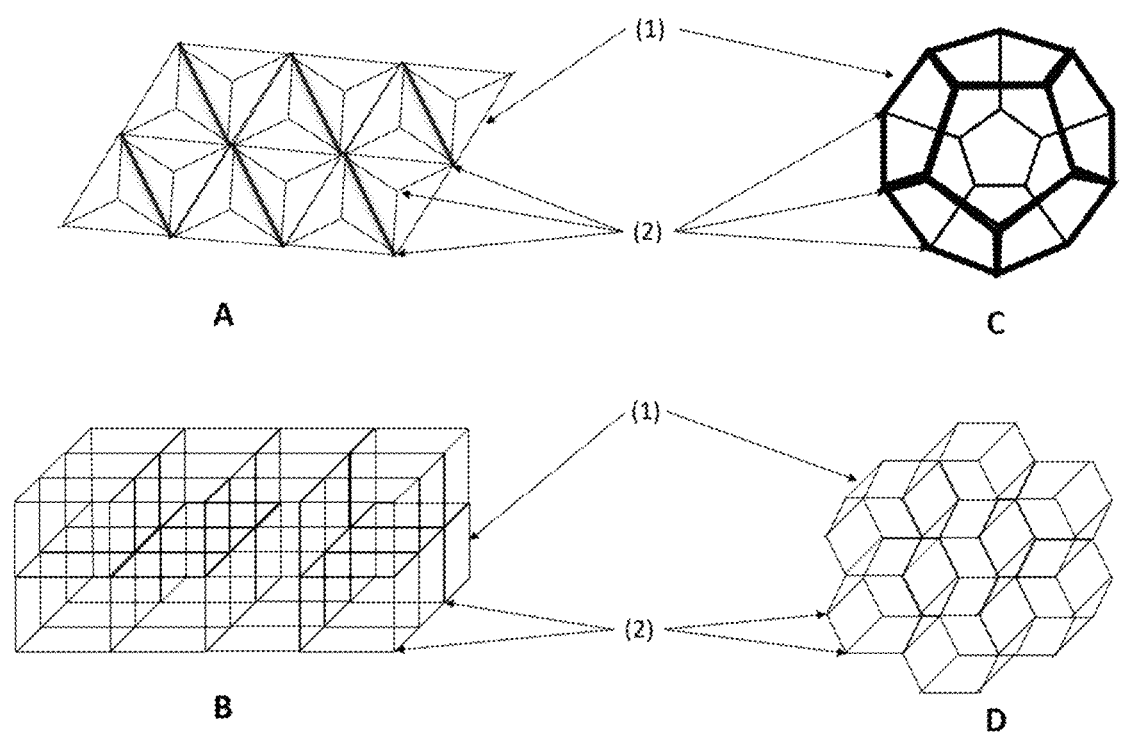
FIG. 1 shows illustrations (not drawn to scale) of sections of four different support structures of the invention (A|B|C|D), in which
(1) material webs; and
(2) crosslinks
are shown.
Figure 2:
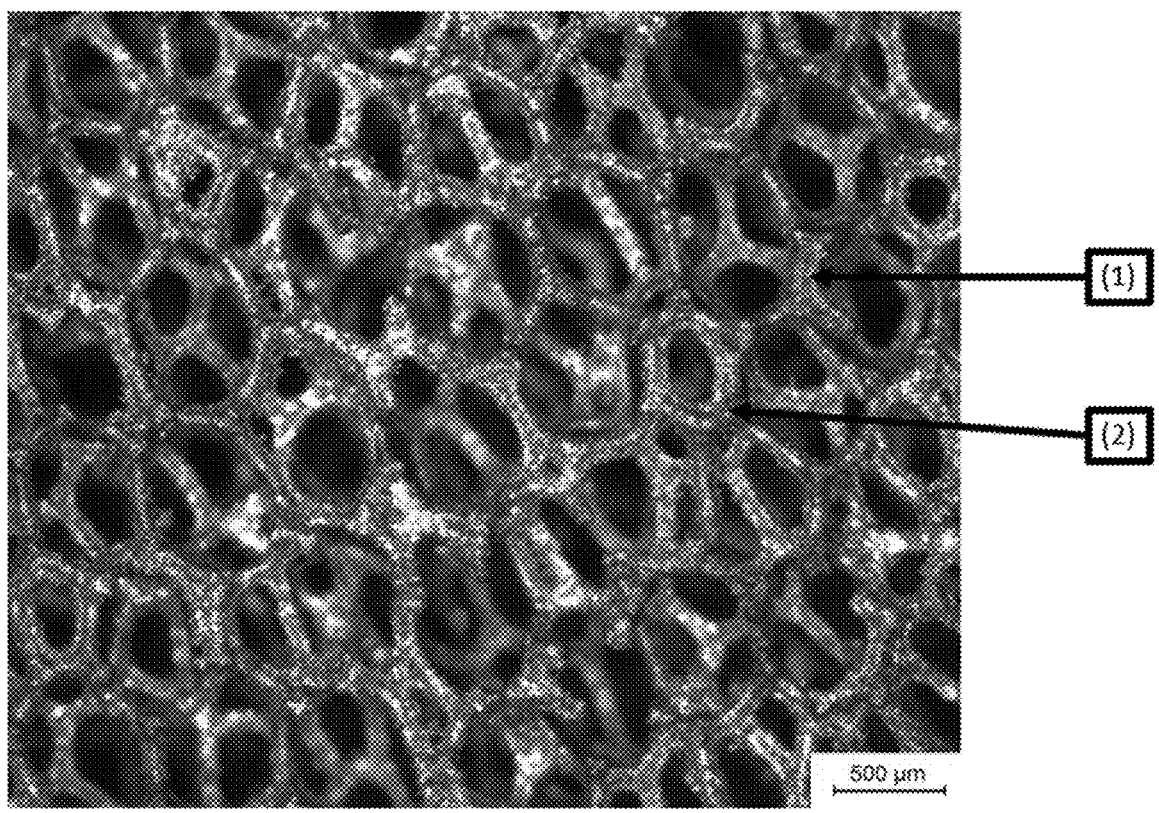
FIG. 2 shows a microscopic image of a metallic support structure of the invention indicating (1) material webs and (2) crosslinks.
Figure 3:
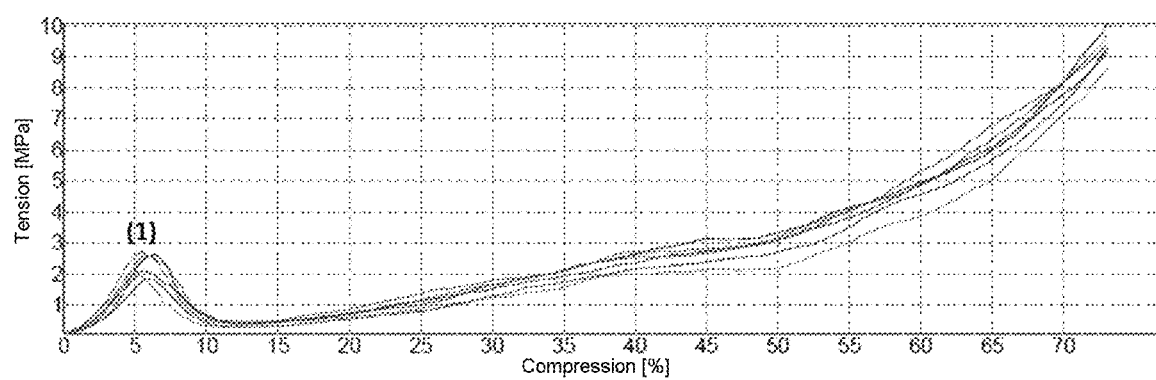
FIG. 3 shows examples of tension-compression curves for determining the compressive strength of support structures of the invention, indicating the local maxima of the tension-compression curves to be evaluated.
Figure 4:
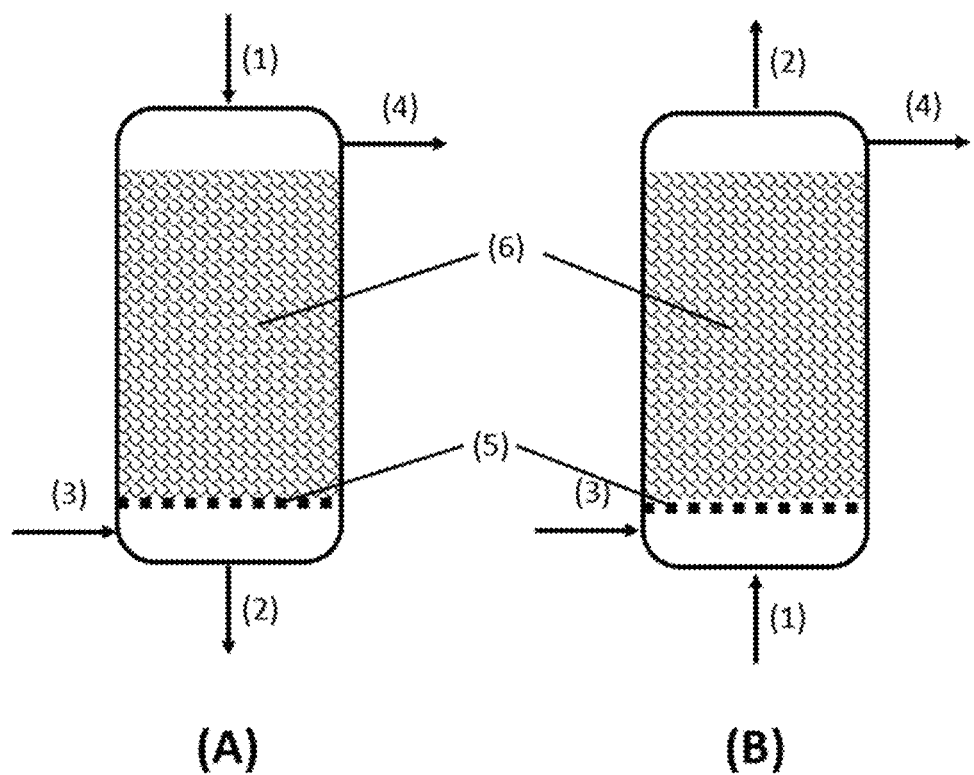
FIG. 4 shows in outline form (not drawn to scale) catalytic reactors of the invention in a trickle-bed design (A) and as a liquid-filled reactor (B), indicating
(1) Reaction medium inflow;
(2) Reaction medium outflow;
(3) Hydrogen gas inflow;
(4) Hydrogen gas outflow;
(5) Sieve tray; and
(6) Catalytic fixed bed of the invention.
Figure 5:
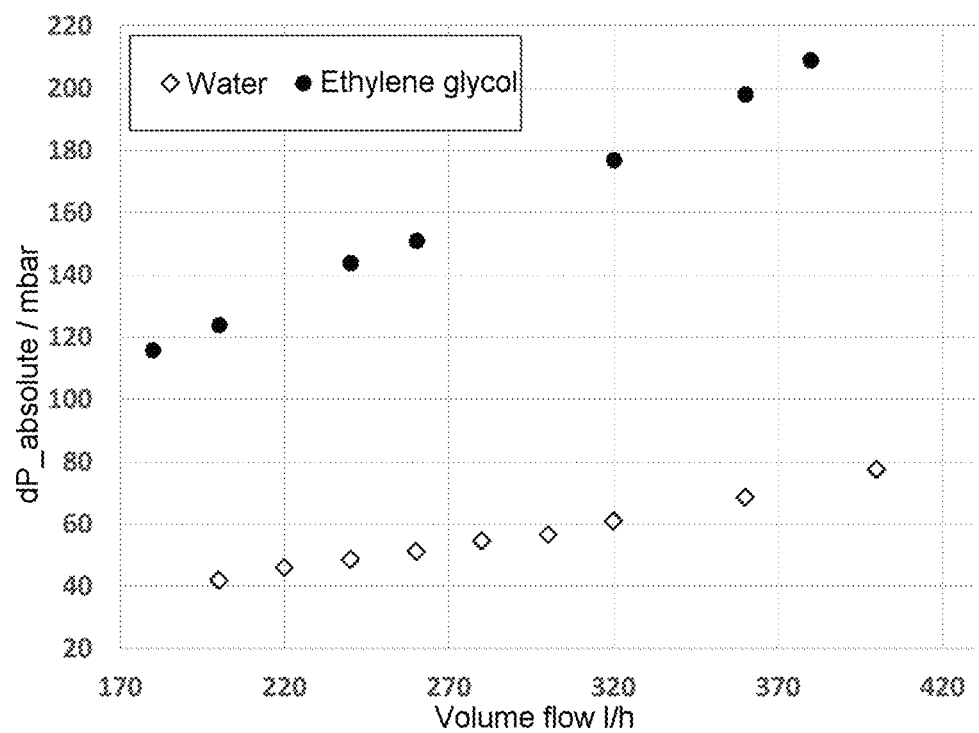

FIG. 5: Result of the pressure-loss measurement (water, ethylene glycol) in the reactor of the invention.

Figure 6:
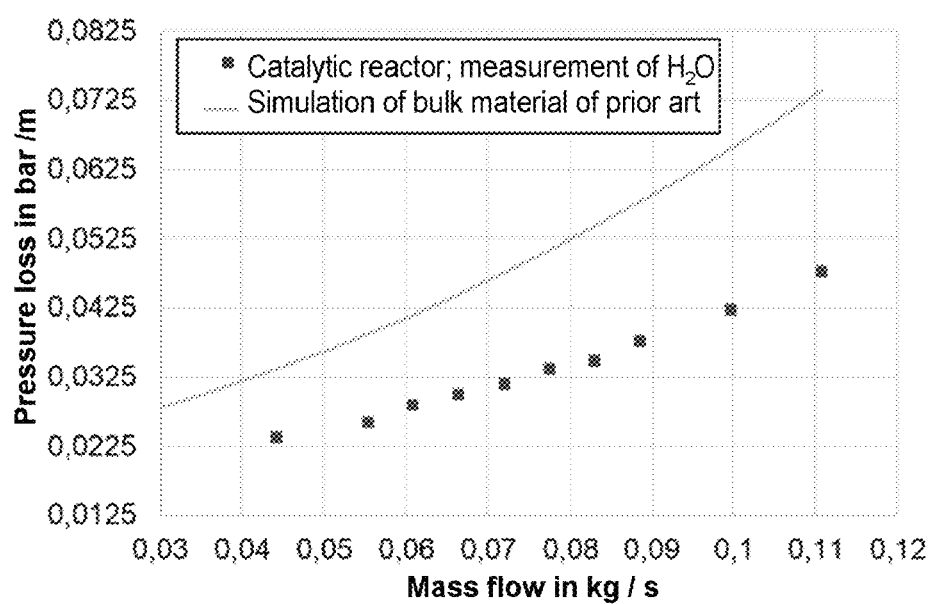

FIG. 6: Comparison of the pressure loss across the fixed bed between the reactor of the invention and conventional bulk material system.

Figure 7:
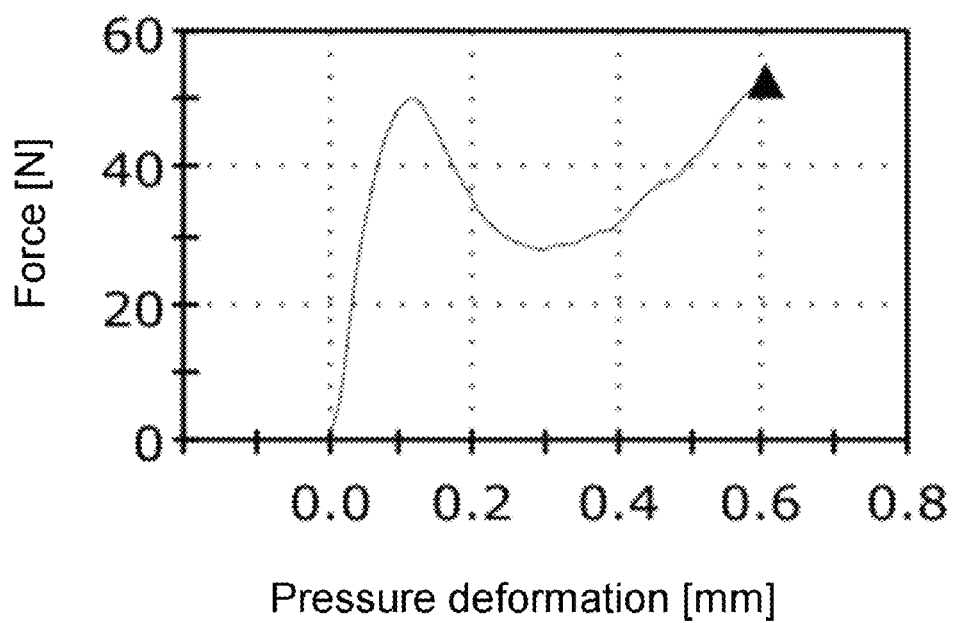

FIG. 7: Example plot of the result of a compressive strength measurement on a sample of a support structure of the invention having the dimensions 4 mm×4 mm×2 mm.

Figure 8:
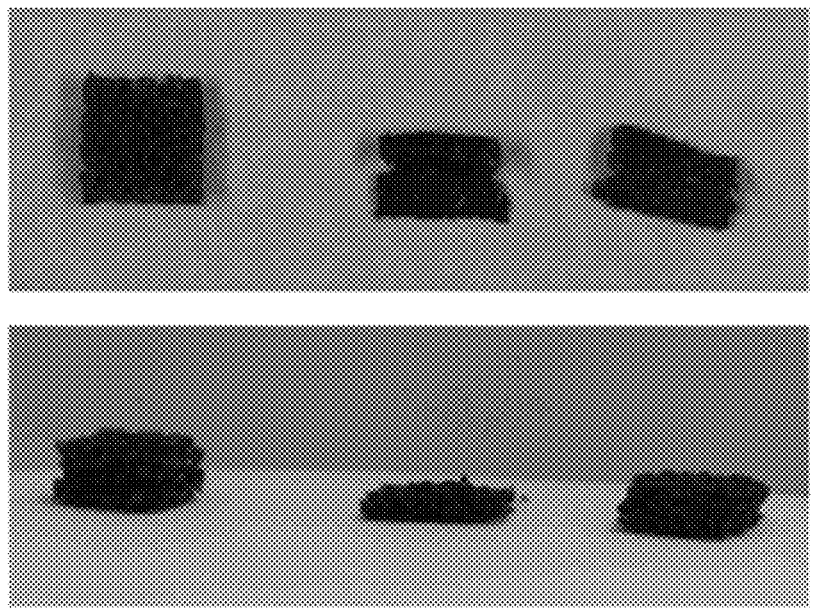

FIG. 8: Deformation of samples of support structures of the invention after performance of the compressive strength measurement.

Figure 9:
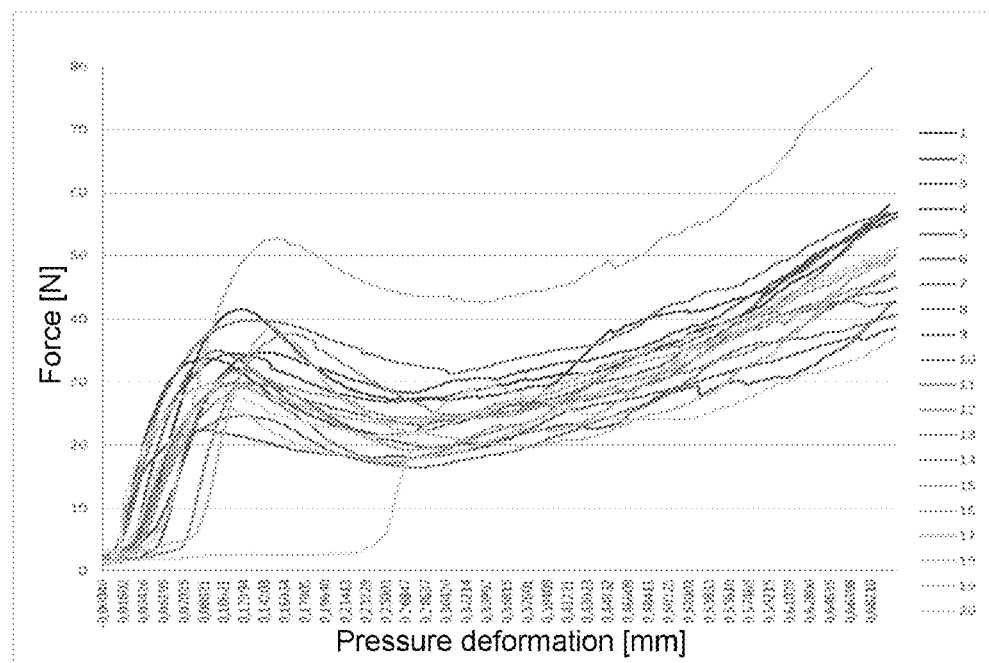

FIG. 9: Result of the compressive strength measurement of a total of 20 samples of support structures of the invention.

Figure 10:
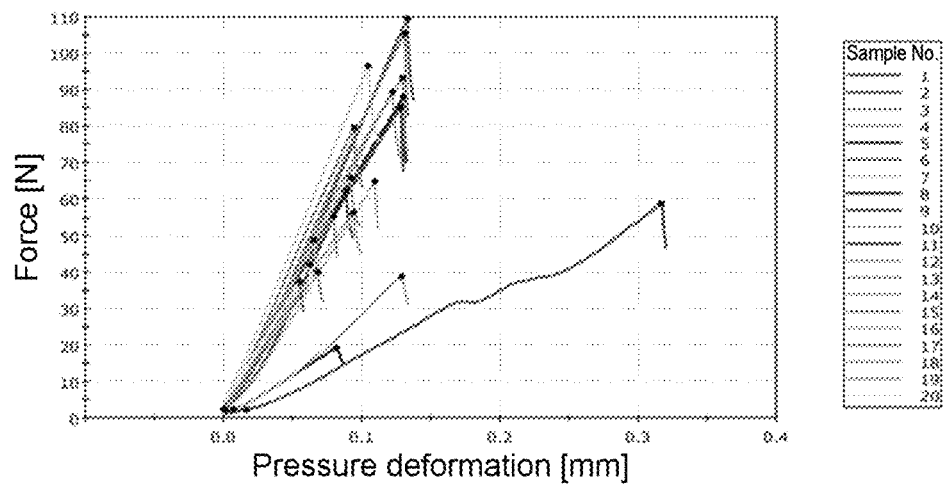

FIG. 10: Result of the compressive strength measurement of a total of 20 samples of a commercial nickel catalyst extrudate of the Octolyst® series. Shaped bodies having dimensions of 2-5 millimetres, a bulk density of 0.7-1.3 kg/L and a nickel content of 15-50% by weight were investigated.

Figure 11:
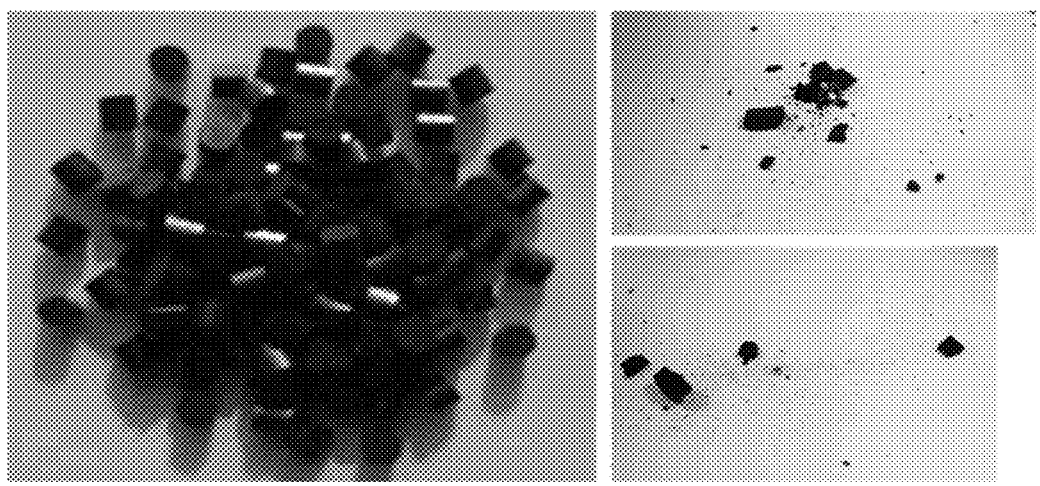

FIG. 11: Nickel catalyst extrudate (prior art) before and after compressive strength measurements.

The invention claimed is:

1. A catalytic reactor, comprising a catalytic fixed bed having a volume of 0.5 to 100 m$^3$, a support structure and a catalyst, wherein, during a reaction, the catalytic fixed bed is filled with a reaction medium to at least 85% by volume and the contact area of the catalyst with the reaction medium is at least 2000 m$^2$ per m$^3$ volume of the catalytic fixed bed; and wherein:
   a) the support structure is formed from material webs having a thickness of 5 to 25 μm, with a crosslinking density of at least 3 mm$^{-3}$ present;
   b) the support structure consists of metals selected from elements of groups 8, 6 and 11 of the periodic table of the elements and mixtures thereof;

c) the support structure is catalytically inert to hydrogenation reactions under the reaction conditions prevailing in the catalytic reactor and serves as a support body for a catalyst that is applied to the support structure in the form of a catalytically active coating.

2. The catalytic reactor of claim 1, wherein the proportion of the catalyst applied to the support structure through coating is 2 to 500 kg per m³ volume of the catalytic fixed bed.

3. The catalytic reactor of claim 2, wherein the catalyst comprises:
60% to 99.8% by weight of support oxides and 0.2% to 10% by weight of catalytically active components, wherein the percentages are, in each case, based on the total amount of catalytic coating forming the catalyst.

4. The catalytic reactor of claim 3, wherein the catalyst further comprises additives and/or functional components.

5. The catalytic reactor of claim 3, wherein the support oxides are selected from the group consisting of: aluminium oxide; silicon dioxide; titanium oxide; and mixtures thereof.

6. The catalytic reactor of claim 3, wherein the catalytically active components are selected from the group consisting of: iron; ruthenium; osmium; cobalt; rhodium; iridium; nickel; palladium; platinum; copper; silver; gold; and mixtures thereof.

7. The catalytic reactor of claim 1, wherein cobalt, nickel, copper and/or mixtures thereof are the principal constituents of the support structure.

8. The catalytic reactor of claim 7, wherein the catalyst applied to the support structure is an activated metal catalyst.

9. The catalytic reactor of claim 8, wherein the catalytic fixed bed contains 2% to 17% by weight of aluminium based on the total mass of the catalytic fixed bed.

10. The catalytic reactor claim 7, wherein the activated metal catalyst is modified with a doping element selected from the group consisting of: molybdenum; platinum; palladium; rhodium; ruthenium; copper; and mixtures thereof.

11. The catalytic reactor of claim 1, wherein the catalytic fixed bed has a volume of 2 to 25 m³.

12. The catalytic reactor of claim 1, wherein the catalytic fixed bed has a fill-weight of between 0.1 and 1 kg/m³.

13. The catalytic reactor of claim 5, wherein the catalytically active components are selected from the group consisting of: iron; ruthenium; osmium; cobalt; rhodium; iridium; nickel; palladium; platinum; copper; silver; gold; and mixtures thereof.

14. The catalytic reactor of claim 13, wherein cobalt, nickel, copper and/or mixtures thereof are the principal constituents of the support structure.

15. The catalytic reactor of claim 14, wherein the catalyst applied to the support structure is an activated metal catalyst.

16. The catalytic reactor of claim 15, wherein the catalytic fixed bed contains 2% to 17% by weight of aluminium based on the total mass of the catalytic fixed bed.

17. The catalytic reactor claim 14, wherein the activated metal catalyst is modified with a doping element selected from the group consisting of: molybdenum; platinum; palladium; rhodium; ruthenium; copper; and mixtures thereof.

18. The catalytic reactor claim 15, wherein the activated metal catalyst is modified with a doping element selected from the group consisting of: molybdenum; platinum; palladium; rhodium; ruthenium; copper; and mixtures thereof.

19. The catalytic reactor of claim 13, wherein the catalytic fixed bed has a volume of 2 to 25 m³.

20. The catalytic reactor of claim 13, wherein the catalytic fixed bed has a fill-weight of between 0.1 and 1 kg/m³.

* * * * *